(12) United States Patent
Yamaguchi et al.

(10) Patent No.: US 9,614,474 B2
(45) Date of Patent: Apr. 4, 2017

(54) PERIODIC DISTURBANCE AUTOMATIC SUPPRESSION DEVICE

(71) Applicant: MEIDENSHA CORPORATION, Tokyo (JP)

(72) Inventors: Takashi Yamaguchi, Tokyo (JP); Yugo Tadano, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 14/646,976

(22) PCT Filed: Dec. 5, 2013

(86) PCT No.: PCT/JP2013/082662
§ 371 (c)(1),
(2) Date: May 22, 2015

(87) PCT Pub. No.: WO2014/088054
PCT Pub. Date: Jun. 12, 2014

(65) Prior Publication Data
US 2015/0326163 A1    Nov. 12, 2015

(30) Foreign Application Priority Data

Dec. 7, 2012 (JP) .................. 2012-267798

(51) Int. Cl.
G05B 13/02 (2006.01)
H02P 21/13 (2006.01)
G05B 19/19 (2006.01)

(52) U.S. Cl.
CPC .............. *H02P 21/13* (2013.01); *G05B 19/19* (2013.01); *G05B 2219/41132* (2013.01)

(58) Field of Classification Search
CPC .................................. H02P 21/13; G05B 11/01
(Continued)

(56) References Cited

U.S. PATENT DOCUMENTS

| 5,489,829 A | 2/1996 | Umida |
| 7,535,192 B2 * | 5/2009 | Takaishi ............... G11B 5/5582 318/400.16 |
| 2014/0039694 A1 | 2/2014 | Yamaguchi et al. |

FOREIGN PATENT DOCUMENTS

| JP | 06-197578 A | 7/1994 |
| JP | 11-285283 A | 10/1999 |

(Continued)

OTHER PUBLICATIONS

Yugo Tadano et al., "Torque Ripple Suppression Control Based on the Periodic Disturbance Observer with a Complex Vector Representation for Permanent Magnet Synchronous Motors", IEEJ Transactions on Industry Applications, vol. 132, No. 1, (2011), pp. 84-93.
(Continued)

*Primary Examiner* — Bentsu Ro
(74) *Attorney, Agent, or Firm* — Foley & Lardner LLP

(57) ABSTRACT

In suppression of torque ripple with a periodic disturbance observer, adjustment of a gain portion is determined sequentially during monitoring operation of monitoring an operating condition. Therefore, many adjusting parameters are involved and achievement of correction is dependent on the skill of a person in charge of adjustment or design. The periodic disturbance observer is provided with a model correcting means or section which calculates an error of an identification model by using a time difference quantity by an output of the periodic disturbance observer and a sensed value of a plant and corrects the identification model with the error of the identification model. Finally, the system performs the torque ripple suppression control with an accurately estimated periodic disturbance.

8 Claims, 3 Drawing Sheets

(58) Field of Classification Search
USPC ................. 318/560, 561, 563, 448, 629, 611
See application file for complete search history.

(56) References Cited

FOREIGN PATENT DOCUMENTS

| | | |
|---|---|---|
| JP | 2012-210067 A | 10/2012 |
| JP | 2012-226411 | 11/2012 |
| WO | WO 2010/024195 A1 | 3/2010 |
| WO | WO-2012/141190 A1 | 10/2012 |

OTHER PUBLICATIONS

Chinese Office Action and English Language translation dated Jun. 20, 2016, 12 pages.
Korean Office Action dated Aug. 3, 2016, 4 pages.

\* cited by examiner

PERIODIC DISTURBANCE AUTOMATIC SUPPRESSION DEVICE

TECHNICAL FIELD

The present invention relates to an automatic periodic disturbance suppression apparatus or device for automatically suppressing torque ripple in a rotating electric machine such as motor, and more specifically to an automatic periodic disturbance suppression apparatus adapted to correct an identification model of a periodic disturbance observer as required during a suppression control.

BACKGROUND ART

Control for suppressing occurrence of periodic disturbance is used in various controls such as electric power system control in receiving and transforming facilities, positioning control with robot, shaft torque resonance suppression in dynamometer system, and vibration suppression of motor housing (relating to riding comfort of a vehicle such as electric vehicle and elevator). In these applications, there is a demand for suppressing periodic disturbance accurately.

A motor, for example, produces torque ripple in principle, and thereby causes various problems such as vibration, noise, adverse influence on ride quality and electrical and mechanical resonances. Especially, in the case of an interior PM motor, there are produced cogging torque ripple and reluctance torque ripple compositely. As a countermeasure, there is proposed a periodic disturbance observer compensating method for suppressing torque ripple.

FIG. 6 is a control block diagram showing a control system for an nth order torque ripple frequency component of a periodic disturbance observer which is known from Patent Document 1, and Non-patent Document 1.

A torque ripple compensation quantity calculating section 1 generates a torque ripple compensation command Tc*n by multiplying differences between sine-wave/cosine-wave control commands rn (normally equal to zero) and estimated quantities $dT_A\hat{}n$, $dT_B\hat{}n$ estimated by a periodic disturbance observer 3, respectively, by sine-wave/cosine-wave values, and adding the results. The torque ripple compensation quantity calculating section 1 delivers the torque ripple compensation command Tc*n to a controlled object 2. In the controlled object 2, periodical disturbance (hereinafter referred to as a periodic disturbance dTn) may be produced. In the case of a motor as the controlled object, for example, the periodic disturbance may be produced in the form of torque ripple which is disturbance synchronous with the revolution, due to cogging torque, and the periodic disturbance causes vibration and noise.

The periodic disturbance observer 3 is a device to suppress the periodic disturbance dTn. Periodic disturbance observer 3 uses a system identification model representing in terms of complex vector, for each of frequency components, and an inverse system model of the disturbance observer, and thereby estimates the disturbance of the frequency to be controlled, directly, to perform compensation.

This control configuration is relatively simple, but effective for providing high suppressing effect to target frequency without regard to the order.

To obtain the system identification model P^n, a system identification is performed to a plant Pn (=P$_{An}$+jP$_{Bn}$) of the controlled object, in advance of the control, and a following equation (1) is obtained in the form of one-dimensional complex vector.

$$P\hat{}n = P\hat{}_{An} + jP\hat{}_{Bn} \tag{1}$$

In this equation, the letter n in the subscript represents an nth order component, and each of the variables is a complex vector expressed as Xn=X$_{An}$+jX$_{Bn}$.

When, for example, the system identification result in the range of 1~1000 [Hz] is expressed in the form of complex vector for each of intervals of 1 Hz, it is possible to represent the system by a table of 1000 elements of one-dimensional complex vectors. Alternatively, it is possible to represent the system by mathematical expression(s) obtained from the identification result. In either case, for a predetermined frequency component, it is possible to form a system model with a simple one-dimensional complex vector. In the explanation as well as in the system identification model, each of P^n, rn, dTn, dT^n and Tn is a complex vector expressed as Xn=X$_{An}$+jX$_{Bn}$.

Torque ripple is disturbance produced periodically in accordance with the rotational phase θ [rad]. Therefore, as a control of the periodic disturbance observer 3, a torque pulsating frequency component extracting means or section is used to transform to cosine coefficient T$_{An}$ and sine coefficient T$_{Bn}$ of an arbitrary order n (Integral multiple of electric rotation frequency). For strict measurement of frequency component, Fourier transform can be used. However, the system of FIG. 6 gives weight to simplicity and employs a low pass filter G$_F$(s) as a simplified form of Fourier transform. The system causes a plant output to pass through the low pass filter G$_F$(s), and thereby extracts a frequency component in which the periodic disturbance dTn is to be suppressed. The system multiplies this quantity by an inverse system represented by a reciprocal $P\hat{}n^{-1}$ of the thus-extracted system identification model, estimates the periodic disturbance dTn from the difference the thus-determined quantity from a control command passed through a low pass filter G$_F$(s), and delivers the estimated quantity as an estimated periodic disturbance $dT\hat{}n$ (=$dT\hat{}_{An}$+$jdT\hat{}_{Bn}$), to the torque ripple compensation calculating section 1. The torque ripple compensation calculating section 1 subtracts the estimated periodic disturbance from the control command rn, and thereby suppress the periodic disturbance dTn.

Patent Document 1: WO2010/024195A1.
Non-patent Document 1: "Torque Ripple Suppression Control Based on the Periodic Disturbance Observer with a Complex Vector Representation for Permanent Magnet Synchronous Motors", the transactions of the Institute of Electrical Engineers of Japan, D, Vol. 132, No. 1. p. 84-93 (2012).

SUMMARY OF THE INVENTION

In the control based on the periodic disturbance observer, the core basis of the control influencing the control performance is the accuracy with respect to true value(s) of the system identification model P^n. To improve the performance of suppressing the periodic disturbance, it is required to improve the accuracy of the system identification. However, it is difficult to obtain an accurate identification model, and it is necessary to take account of long term variation of the plant due to aging or other factors, and short term variation due to unexpected sudden system variation. Error in the identification model might increase the settling time to the end of suppression, and make the control unstable because of the suppression control itself serving as a disturbance at worst. Therefore, there is a demand for improving the robustness to the error in the identification model.

Adjustment of a gain portion is heretofore determined sequentially during monitoring operation of monitoring an operating condition. In this case, many adjusting parameters are involved and achievement of correction is dependent on the skill of a person in charge of adjustment or design. Moreover, model correction is unfeasible as to conditions beyond the scope of assumption of the sequence.

It is an object of the present invention to decrease the number of adjusting parameters and to provide a periodic disturbance suppressing system or apparatus not dependent on the skill of a person for the adjustment and/or design.

Means for Solving the Problem

According to one aspect of the present invention, in a periodic disturbance automatic suppressing apparatus for calculating an estimated periodic disturbance or estimated value of a periodic disturbance by inputting an output of a controlled object producing periodic disturbance, into a periodic disturbance observer, and for controlling the controlled object in accordance with a difference between the calculated estimated periodic disturbance and a control command, there is provided a model correcting means or section for the periodic disturbance observer, the model correcting means or section being configured to calculate an error from a corrected identification model corrected by using a time difference quantity by an output of the periodic disturbance observer and a sensed value of the controlled object when the control command and the periodic disturbance are assumed to be constant during a predetermined time difference, and to feed back the error from the corrected identification model into an identification model of the periodic disturbance observer.

According to one aspect of the present invention, the model correcting section is configured to determine an estimated system model $P^{\wedge\wedge}n$ estimated from the time difference quantity during a time difference or time interval t1~t2, according to a following equation by setting, as ynt, an nth order output of the controlled object at an instant t, setting, as $d^{\wedge}n \cdot t$, an nth order estimated periodic disturbance at the instant t, and setting, as $y^{\wedge}n$, an estimated plant output of the identification model $P^{\wedge}n$, $$Pn = -(y_n \cdot t_2 - y_n \cdot t_1)/(d^{\wedge}_n \cdot t_2 - d^{\wedge}_n \cdot t_1)$$
$$= P^{\wedge\wedge}n$$

where Pn is a plant, and each quantity is a complex number.

According to another aspect of the present invention, the model correcting section is configured to determine an estimated identification model $^{pref}n \cdot P^{\wedge}n$ estimated from the time difference quantity during a time difference or time interval t1~t2, according to a following equation by setting, as ynt, an nth order output of the controlled object at an instant t, setting, as $d^{\wedge}n$, an nth order estimated periodic disturbance, and setting, as $y^{\wedge}n$, an estimated plant output of the identification model $P^{\wedge}n$, $$Pn = -(y_n \cdot t_2 - y_n \cdot t_1)/(y^{\wedge}_n \cdot t_2 - y^{\wedge}_n \cdot t_1) \cdot P^{\wedge}n = {}^{pref}n \cdot P^{\wedge}n$$

where Pn is a plant, and each quantity is a complex number.

According to still another aspect of the present invention, there are provided a plurality of periodic disturbance observers provided with the model correcting means or section, connected in parallel, and configured to produce a plurality of estimated periodic disturbances.

BEST MODE(S) FOR CARRYING OUT THE INVENTION

According to the present invention, in a system or apparatus for calculating an estimated periodic disturbance or estimated value of a periodic disturbance by inputting an output of a controlled object undergoing or producing periodic disturbance, into a periodic disturbance observer, and for controlling the controlled object in accordance with a difference between the calculated estimated periodic disturbance and a control command, the periodic disturbance observer is provided with a model correcting section or means to correct the estimated periodic disturbance with an error of a corrected identification model corrected by using a time difference quantity or time difference quantities due to an output or output value of the periodic disturbance observer and/or a sensed value of the controlled object, as explained below in detail with reference to the drawings.

Figure 1:
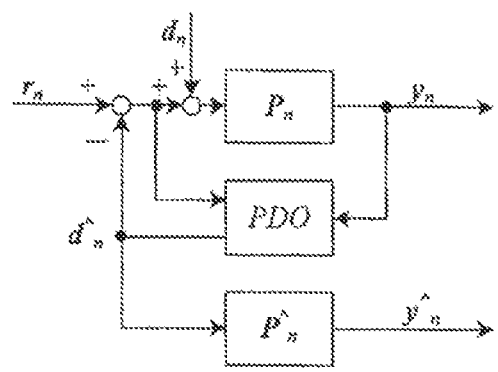
FIG. 1 is a block diagram showing a basic periodic disturbance observer control system.

FIG. 1 shows a periodic disturbance observer control structure according to a first embodiment of the present invention. In FIG. 1, following symbols are used.

Figure 6:
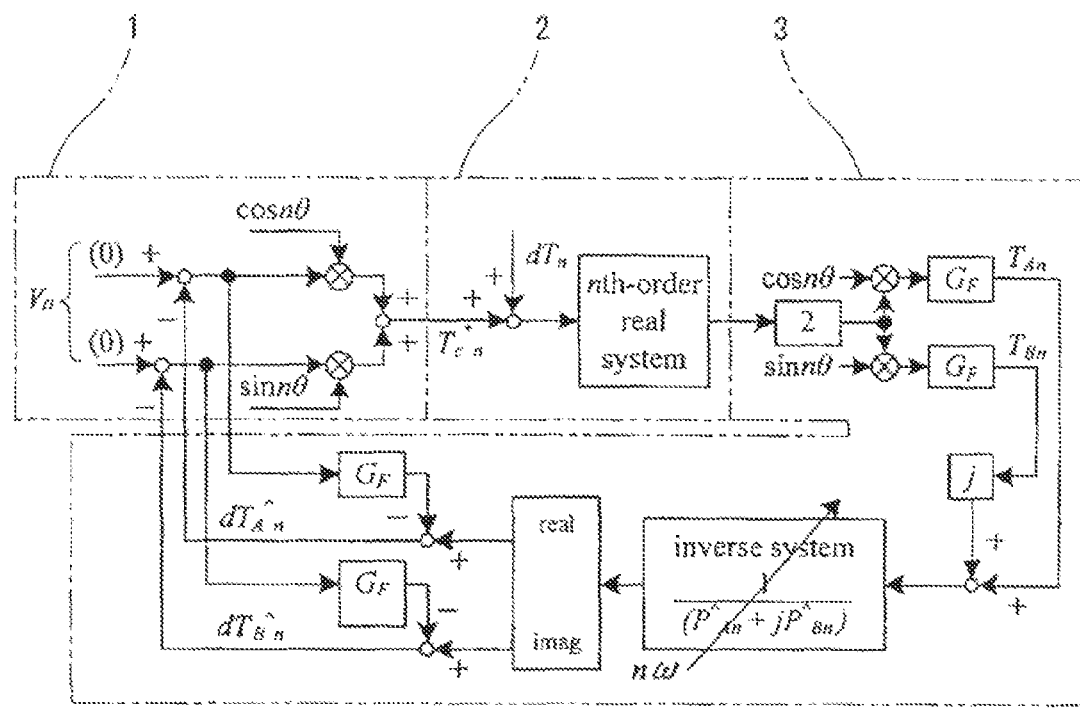
FIG. 6 is a block diagram showing a whole of the periodic disturbance observer control system.

$P_n$: plant (controlled object), $d^{\wedge}_n$: estimated periodic disturbance (system identification model), $y_n$: controlled object output (corresponding to $T_{An}$, $T_{Bn}$ in FIG. 6), $r_n$: nth order control command, $d_n$: nth order disturbance, $d^{\wedge}_n \cdot t$: nth order compensation command at instant t (corresponding to $dT_A{}^{\wedge}n$, $dT_B{}^{\wedge}n$ in FIG. 6), $P^{\wedge}_n$: identification model, $y^{\wedge}_n$: estimated plant output of the identification model $P^{\wedge}_n$ when $d^{\wedge}_n$, is a disturbance, PDO: periodic disturbance observer, $y_n \cdot t$: nth order output at instant t. Quantities in the s region are represented by instant t after comma of subscript.

Equations of state are expressed at an instant t1 by following expressions (2) and (3). It is assumed that the command or command value is constant while $t=t_1 \sim t_2$, and the command is a steady-state value having no periodicity expressed as $r_n=0[n>0]$. Each quantity is a complex number.

$$(d_n - d^{\wedge}_n \cdot t_1) \times P_n = y_n \cdot t_1 \quad (2)$$

$$d^{\wedge}_n \cdot t_1 \times P^{\wedge}_n = y^{\wedge}_n \cdot t_1 \quad (3)$$

Similarly, equations of state are expressed at an instant t2 by following expressions (4) and (5).

$$(d_n - d^{\wedge}_n \cdot t_2) \times P_n = y_n \cdot t_2 \quad (4)$$

$$d^{\wedge}_n \cdot t_2 \times P^{\wedge}_n = y^{\wedge}_n \cdot t_2 \quad (5)$$

Following equations (6) and (7) are obtained by determining, from the equations (2)~(5), difference quantities or differences between the instants. In this case, it is possible to remove a steady-state term of the disturbance by determining the difference quantities on the assumption that the disturbance $d_n$ and plant $P_n$ are constant without regard to time. Moreover, the time difference between obtaining or sampling instants t1 and t2 is several milliseconds [ms] as a desired value. Even if plant variation and/or disturbance variation is produced during operation, the period of the variation is assumed to be very long as compared to the time difference between instants t1 and t2, and the above-mentioned assumption is considered to be valid.

$$-(d\hat{}_n \cdot t_2 - d\hat{}_n \cdot t_1) \times P_n = y_n \cdot t_2 - y_n \cdot t_1 \qquad (6)$$

$$(d\hat{}_n \cdot t_2 - d\hat{}_n \cdot t_1) \times P\hat{}_n = y\hat{}_n \cdot t_2 - y\hat{}_n \cdot t_1) \qquad (7)$$

An equation (8) is obtained from the equation (6), and an equation (9) is obtained by substituting the equation (7) into the equation (8). A system model estimated from the difference result is set as $P\hat{}\hat{}n$, and an error or error quantity with respect to the identification model is set as $^{pref}n$, $$Pn = -(y_n \cdot t_2 - y_n \cdot t_1 / d\hat{}n \cdot t_2 - d\hat{}n \cdot t_1) \qquad (8)$$
$$(= P\hat{}\hat{}n)$$

$$Pn = -(y_n \cdot t_2 - y_n \cdot t_1)/(y\hat{}_n \cdot t_2 - y\hat{}_n \cdot t_1) \cdot P\hat{}n \qquad (9)$$
$$= P^{ref}_n \cdot P\hat{}n$$

In this way, it is possible to estimate the system model by using the difference of state between the instants t1 and t2. It is possible to perform a correction by feeding this back to the identification model $P\hat{}n$, and finally to obtain the estimated disturbance $d\hat{}n$ accurately.

Figure 2:
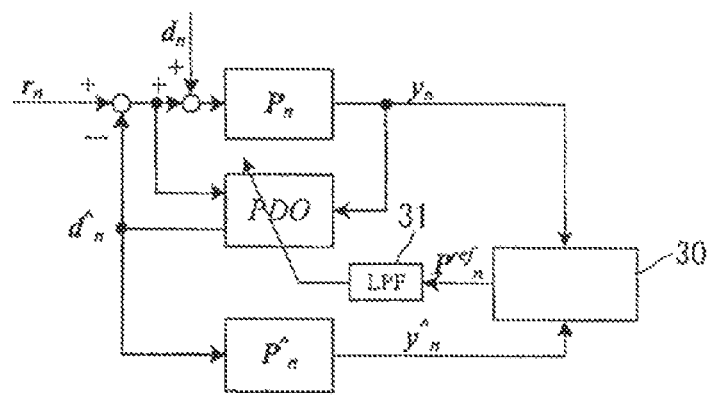
FIG. 2 is a block diagram of a periodic disturbance observer control system representing an embodiment of the present invention.
Figure 3:
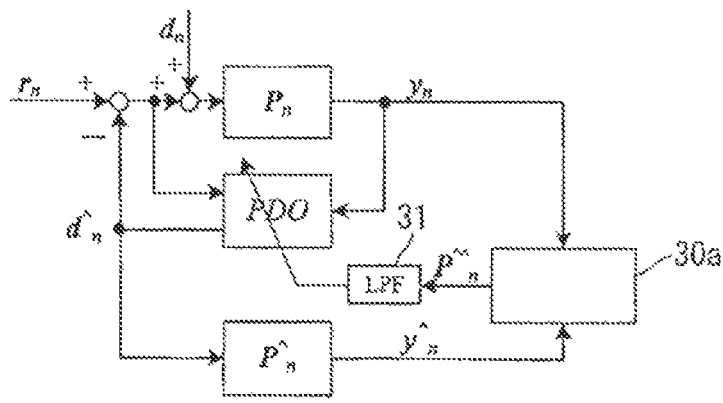
FIG. 3 is a block diagram of a periodic disturbance observer control system representing another embodiment of the present invention.

FIG. 2 is a control block diagram of the periodic disturbance observer provided with a model correcting section or means. The model correcting section 30 performs a correcting calculation according to the equation (9). That is, model correcting section 30 receives, as inputs, an nth order plant output compensation quantity $y\hat{}n$ from the identification model $P\hat{}n$ and a plant output yn, and performs the calculation corresponding to equation (9). The calculation of equation (9) involves differential operation, and hence noise is included. Therefore, the output of model correcting section 30 is passed through a low pass filter 31 for removing the noise. As to the other operations, the system of FIG. 2 performs basic operations in the same manner as the system of FIG. 6.

Therefore, the periodic disturbance observer PDO can correct the identification model any time as needed during the torque ripple suppressing control by outputting correction command to a phase error and a gain error by using an error with respect to the corrected identification model. As a result, the apparatus of this embodiment can reduce the number of adjusting parameters, and enable a more accurate periodic disturbance suppression without resorting to the skill or workmanship of a person for adjustment and a designer.

According to the first embodiment, the internal model in the periodic disturbance observer PDO is corrected by the model correcting section or means 30 having a calculating means corresponding to the equation (9). In a second embodiment, a model correcting section or means 30a performs a calculation using the system model $P\hat{}\hat{}n$ estimated from the difference result of the equation (8). By using $P\hat{}\hat{}n$, the apparatus can suppress disturbance even if the identification model $d\hat{}n$ is completely unknown. In this case, the control is performed by enabling the model correcting function always, and using the system model $P\hat{}\hat{}n$ estimated from the difference quantity by the model correcting section 30a according to the equation (8), for the internal model.

Therefore, this embodiment can provide the effects as in the first embodiment. Moreover, because the estimation of the system model is feasible by using sensed value of the time difference quantity between instants t1 and t2, the apparatus of this embodiment is effective especially when the system identification is not possible beforehand.

The above-mentioned first and second embodiments employ the means for adaptively correcting the identification model of the periodic disturbance observer PDO at a certain frequency. In a third embodiment, the apparatus is additionally provided with a learning (storage) function recording a final value of the correction by the model correcting section 30 (30a), in a memory function.

Figure 4:
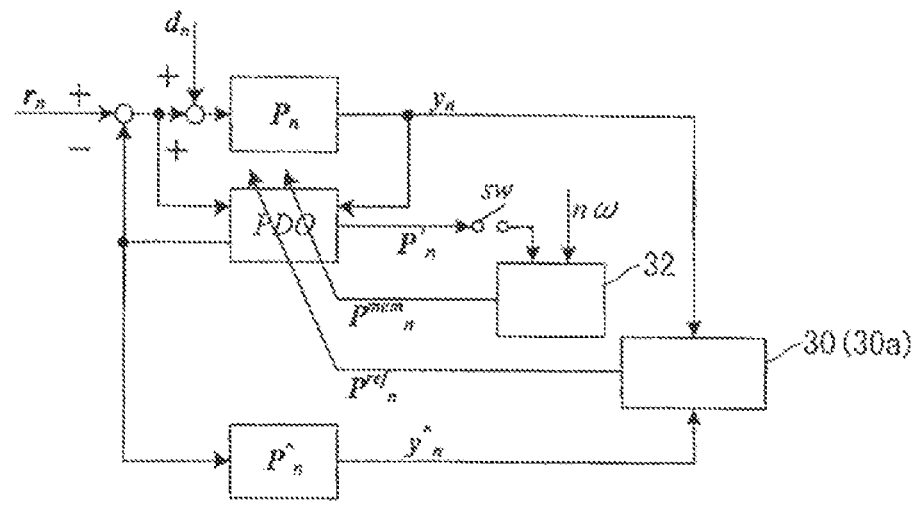
FIG. 4 is a block diagram of a periodic disturbance observer control system representing still another embodiment of the present invention.

FIG. 4 is a control block diagram for the periodic disturbance observer PDO according to the third embodiment. There are provided a memory function of memory function section 32 and a switch SW. In the other points, the system of FIG. 4 is constructed in the same manner as the system of FIG. 2.

The memory function section 32 stores table data for referring to a rotation frequency nω of the plant and the system identification error $^{pref}n$. As expressed by an equation (10), a corrected identification model P'n is determined by multiplying the equation (9), by a memory output of a rotation vector $Pn^{mem}$, and this identification model P'n is used for the control in the periodic disturbance observer PDO.

$$P'n = ^{pref}n \cdot P\hat{}n \cdot Pn^{mem} \qquad (10)$$

As to the timing of storing the corrected identification mode P'n in the memory function section 32, the corrected identification model P'n is stored at a switching timing of the switch SW which is switched at a timing when an operation of correcting the identification model is performed and the periodic disturbance is suppressed sufficiently. By storing the system identification error $^{pref}n$ at that timing in the memory function section 32, the apparatus leans the result of the correcting operation.

In addition to the effects of the first embodiment, this embodiment can provide following effects. The apparatus according to this embodiment is capable of learning the correction quantity with respect to the identification model error at a given frequency. Accordingly, it is possible to reduce the learning time until the end of correction in a next operation at the same frequency, or to eliminate the need of the operation.

Figure 5:
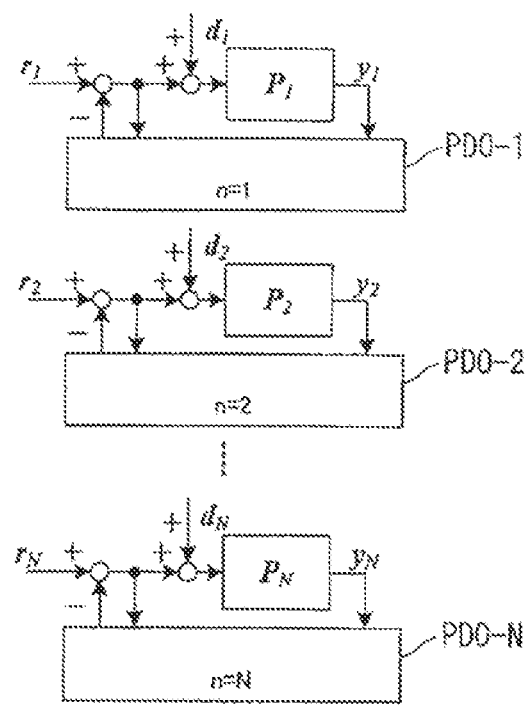
FIG. 5 is a block diagram of a periodic disturbance observer control system representing still another embodiment of the present invention.

In the preceding embodiments, the apparatus is arranged to be able to estimate the identification model error and correct the identification model at a predetermined frequency. In a fourth embodiment shown in FIG. 5, the apparatus includes a control system provided for each of the orders of suppression, and the control systems provided, respectively, for the orders are arranged in parallel with one another so as to form parallel and simultaneous arrangement. In other words, the apparatus includes N units or sections each including a periodic disturbance observer PDO provided with a model error correction shown in FIGS. 1~4, for estimating an identification model error with respect to an nth order periodic disturbance component to be estimated. Estimated periodic disturbances $d\hat{}n-1~d\hat{}n-N$ obtained by the correction of the system identification model with the estimated errors are delivered to the torque ripple compensation calculating section 1 (shown in FIG. 6).

As explained above, according to the present invention, it is possible to reduce the number of the adjusting parameters, and enable an accurate periodic disturbance suppression control without the need for depending on the skill of a person for adjustment or design.

The invention claimed is:

1. A periodic disturbance automatic suppressing apparatus for calculating an estimated periodic disturbance by inputting an output of a controlled object producing periodic disturbance, into a periodic disturbance observer, and for controlling the controlled object in accordance with a difference between the estimated periodic disturbance and a control command, the periodic disturbance automatic suppressing apparatus comprising a model correcting means provided for the periodic disturbance observer, the model correcting means being configured to calculate an error from a corrected identification model corrected by using a time difference quantity by an output of the periodic disturbance observer and a sensed value of the controlled object when the control command and the periodic disturbance are assumed to be constant during a predetermined time difference and to feed back the error from the corrected identification model into an identification model of the periodic disturbance observer.

2. The periodic disturbance automatic suppressing apparatus as recited in claim 1, wherein the model correcting means is configured to determine an estimated system model $P\hat{\ }n$ estimated from the time difference quantity during a time difference $t1\sim t2$, according to a following equation by setting, as $y_n \cdot t$, an nth order output of the controlled object at an instant t, setting, as $\hat{d}_n \cdot t$, an nth order estimated periodic disturbance at the instant t, and setting, as $\hat{y}_n$, an estimated plant output of the identification model $P\hat{\ }n$, $$Pn = -(y_n \cdot t_2 - y_n \cdot t_1)/(d_n^\wedge \cdot t_2 - d_n^\wedge \cdot t_1)$$
$$= P^{\wedge\wedge}n$$

where Pn is a plant, and each quantity is a complex number.

3. The periodic disturbance automatic suppressing apparatus as recited in claim 1, wherein the model correcting means is configured to determine an estimated identification model $^{pref}n \cdot P\hat{\ }n$ estimated from the time difference quantity during a time difference $t1\sim t2$, according to a following equation by setting, as $y_n \cdot t$, an nth order output of the controlled object at an instant t, setting, as $\hat{d}_n \cdot t$, an nth order estimated periodic disturbance at the instant t, and setting, as $\hat{y}_n$, an estimated plant output of the identification model $P\hat{\ }n$, $$Pn = -(y_n \cdot t_2 - y_n \cdot t_1 / (y^\wedge_n \cdot t_2 - y^\wedge_n \cdot t_1) \cdot P^\wedge n$$
$$= Pref_n \cdot P^\wedge_n$$

where Pn is a plant, and each quantity is a complex number.

4. The periodic disturbance automatic suppressing apparatus as recited in claim 1, wherein the periodic disturbance automatic suppressing apparatus comprises a plurality of the periodic disturbance observers provided with the model correcting means, connected in parallel and configured to produce a plurality of estimated periodic disturbances.

5. A periodic disturbance automatic suppressing apparatus for calculating an estimated periodic disturbance by inputting an output of a controlled object producing periodic disturbance, into a periodic disturbance observer, and for controlling the controlled object in accordance with a difference between the estimated periodic disturbance and a control command, the periodic disturbance automatic suppressing apparatus comprising a model correcting section to correct an identification model of the periodic disturbance observer in accordance with a time difference quantity of the output of the controlled object during a predetermined time difference, wherein the model correcting section is configured to correct the identification model of the periodic disturbance observer in accordance with the time difference quantity of the output of the controlled object during the predetermined time difference and a time difference quantity of an output of the periodic disturbance observer during the predetermined time difference.

6. A periodic disturbance automatic suppressing apparatus for calculating an estimated periodic disturbance by inputting an output of a controlled object producing periodic disturbance, into a periodic disturbance observer, and for controlling the controlled object in accordance with a difference between the estimated periodic disturbance and a control command, the periodic disturbance automatic suppressing apparatus comprising a model correcting section to correct an identification model of the periodic disturbance observer in accordance with a time difference quantity of the output of the controlled object during a predetermined time difference, wherein the model correcting section is configured to correct the identification model of the periodic disturbance observer in accordance with the time difference quantity of the output of the controlled object during the predetermined time difference and a time difference quantity of an output of the identification model of the periodic disturbance observer during the predetermined time difference.

7. A periodic disturbance automatic suppressing process comprising:

calculating an estimated periodic disturbance by inputting an output of a controlled object producing periodic disturbance, into a periodic disturbance observer;

controlling the controlled object in accordance with a difference between the estimated periodic disturbance and a control command;

correcting an identification model of the periodic disturbance observer in accordance with a time difference quantity of the output of the controlled object during a predetermined time difference; and correcting the identification model of the periodic disturbance observer in accordance with the time difference quantity of the output of the controlled object during the predetermined time difference and a time difference quantity of an output of the periodic disturbance observer during the predetermined time difference.

8. A periodic disturbance automatic suppressing process comprising:

calculating an estimated periodic disturbance by inputting an output of a controlled object producing periodic disturbance, into a periodic disturbance observer;

controlling the controlled object in accordance with a difference between the estimated periodic disturbance and a control command;

correcting an identification model of the periodic disturbance observer in accordance with a time difference quantity of the output of the controlled object during a predetermined time difference and a time difference quantity of an output of the identification model of the periodic disturbance observer during the predetermined time difference.

* * * * *